(12) United States Patent
Kubota et al.

(10) Patent No.: US 8,866,386 B2
(45) Date of Patent: Oct. 21, 2014

(54) DIRECTION INDICATION LAMP CONTROL DEVICE, DIRECTION INDICATION DEVICE AND WIRE DISCONNECTION DETECTION METHOD OF THE DIRECTION INDICATION DEVICE

(75) Inventors: Kenichi Kubota, Hanno (JP); Hideyuki Ono, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 13/812,098

(22) PCT Filed: Oct. 31, 2011

(86) PCT No.: PCT/JP2011/075094
§ 371 (c)(1),
(2), (4) Date: Jan. 24, 2013

(87) PCT Pub. No.: WO2013/065107
PCT Pub. Date: May 10, 2013

(65) Prior Publication Data
US 2013/0140991 A1    Jun. 6, 2013

(51) Int. Cl.
*B60Q 1/14* (2006.01)
*H05B 33/08* (2006.01)
*B60Q 1/34* (2006.01)
*H05B 37/03* (2006.01)
*B60Q 11/00* (2006.01)

(52) U.S. Cl.
CPC .......... *H05B 37/032* (2013.01); *H05B 33/0842* (2013.01); *B60Q 1/34* (2013.01); *B60Q 11/007* (2013.01)
USPC ............. 315/77; 315/225; 315/191; 315/194; 315/82; 340/475; 340/815.45

(58) Field of Classification Search
CPC ...... B60Q 1/38; B60Q 11/005; B60Q 1/1415; H05B 33/0815; H05B 37/029; G09F 9/33
USPC ............. 315/77, 82, 291, 225, 201, 294, 185; 340/815.45, 475
See application file for complete search history.

(56) References Cited

U.S. PATENT DOCUMENTS 7,005,978 B2 * 2/2006 Takeuchi et al. ............... 340/475
2005/0073428 A1 * 4/2005 Sugimoto et al. ........ 340/815.45

FOREIGN PATENT DOCUMENTS

| JP | 64-90831 | 4/1989 |
|----|----------|--------|
| JP | 2004-168076 | 6/2004 |

(Continued)

OTHER PUBLICATIONS

ISR for corresponding PCT/JP2011/075094 dated Jan. 31, 2012.

(Continued)

*Primary Examiner* — Douglas W Owens
*Assistant Examiner* — Syed M Kaiser
(74) *Attorney, Agent, or Firm* — Ladas & Parry, LLP

(57) ABSTRACT

A direction indication lamp control device includes: a current control element including an end which outputs a drive current having a magnitude corresponding to amplitude of a pulse signal; a current clamp unit which limits the drive current to a current upper limit value; a voltage clamp unit which limits a reference voltage to a voltage upper limit value; and a wire disconnection detection unit which outputs a wire disconnection detection signal in a case where the drive current corresponding to the pulse wave of the pulse signal is equal to or less than a wire disconnection detection value, or in a case where the reference voltage is equal to the voltage upper limit value. The current upper limit value is smaller than the drive current flowing through a direction indication lamp when the reference voltage is the voltage upper limit value.

14 Claims, 5 Drawing Sheets

(56) References Cited

FOREIGN PATENT DOCUMENTS

| | | |
|---|---|---|
| JP | 2005-112071 | 4/2005 |
| JP | 2007-091164 | 4/2007 |

OTHER PUBLICATIONS

IPRP for corresponding PCT/JP2011/075094 issued on May 6, 2014 and its English translation.

* cited by examiner

DIRECTION INDICATION LAMP CONTROL DEVICE, DIRECTION INDICATION DEVICE AND WIRE DISCONNECTION DETECTION METHOD OF THE DIRECTION INDICATION DEVICE

CROSS-REFERENCE TO RELATED APPLICATIONS:

This application is the U.S. National Stage of International Patent Application No. PCT/JP2011/075094 filed on Oct. 31, 2011, the disclosure of which is hereby incorporated by reference in its entirety.

TECHNICAL FIELD

The present invention relates to a direction indication lamp control device, a direction indication device, and a wire disconnection detection method of the direction indication device, which use an LED element as a direction indication lamp.

BACKGROUND ART

For example, a direction indication device as illustrated in FIG. 6 is known as a direction indication device for a motorcycle. The direction indication device includes a diode D101, a capacitor C101, a direction indication switch SW, a left-side direction indication lamp 102L, a right-side direction indication lamp 102R, an internal power source 103, an oscillator 104a, a buffer 104b, an N-type MOS transistor NM101, a comparator COMP101 for wire disconnection detection, and a current detection resistor R101. The left-side direction indication lamp 102L has a left-front-side bulb 102LF and a left-rear-side bulb 102LR which are connected to each other in parallel. The right-side direction indication lamp 102R has a right-front-side bulb 102RF and a right-rear-side bulb 102RR which are connected to each other in parallel. The diode D101 and the capacitor C101 function as a bootstrap circuit.

Operation of the direction indication device will be described. For example, when the direction indication switch SW is ON to the side of an L terminal, a terminal on the negative side of the capacitor C101 is grounded via the bulbs 102LF and 102 LR. Thus, current from a battery B flows through the capacitor C101 via the diode D101, and thus the capacitor C101 is charged. Accordingly, the internal power source 103, the oscillator 104a, a buffer 104b and the comparator COMP101, to which an internal power supply voltage Vcc is supplied from a terminal on the positive side of the capacitor C101, and to which a reference voltage VS is supplied from the terminal on the negative side, are activated. The internal power source 103 generates a voltage V101 or the like supplied to the comparator COMP101.

The activated oscillator 104a generates an oscillation pulse signal. The buffer 104b outputs the pulse signal by buffering the oscillation pulse signal. The N-type MOS transistor NM101 causes a drive current, a magnitude of the drive current corresponding to the amplitude of a pulse signal supplied to a gate, to flow from a drain to which the power supply voltage VDD is supplied, to a source. The drive current flows through the bulbs 102LF and 102LR of the direction indication lamp 102L via the current detection resistance R101 and the direction indication switch SW. Accordingly, the direction indication lamp 102L blinks at a period of the oscillation pulse signal.

In the direction indication device, in a case where any one of the front-side and rear-side bulbs 102 LF and 102 RF is wire-disconnected, the drive current is reduced. Consequently, the comparator COMP101 detecting an increase in the power supply voltage VDD resulting from a decrease in the drive current controls the oscillator 104a and thus causes a period of the oscillation pulse signal to be changed. Accordingly, since a blinking period of the direction indication lamp 102L is changed, the wire disconnection of the bulb may be reported to a user or the like.

The direction indication device as disclosed in JP 1-90831 A is also known as a device similar to this direction indication device.

Incidentally, it is desired that an LED element is used as the direction indication lamps 102L and 102R of the direction indication device, instead of a bulb. In this case, in order to extend a lifetime of an LED element and stabilize an amount of light, the LED element is preferably controlled so that constant current flows through the LED element.

However, in a case where the constant current control is performed, drive current remains unchanged and the wire disconnection detection may not be performed by monitoring a change in the drive current, even though any one of the front-side and rear-side LED elements is disconnected, because the control is performed so that twice the current flows through the remaining normal LED element to make constant current flow. Furthermore, when twice the current flows through the remaining LED element at the time of one-side wire disconnection, the lifetime of the LED element is notably shortened.

DISCLOSURE OF THE INVENTION

An object of the present invention is to provide a direction indication lamp control device, a direction indication device, and a wire disconnection detection method of the direction indication device, which may detect wire disconnection of an LED element as a direction indication lamp and may extend a lifetime of the LED element.

A direction indication lamp control device for controlling a direction indication lamp configured with LED elements connected in parallel, according to one aspect of the invention, includes:

a pulse signal generation unit that generates a pulse signal having a predetermined period;

a current control element including one end to which power supply voltage is supplied, a control terminal to which the pulse signal is supplied, and the other end which outputs a drive current having a magnitude corresponding to amplitude of the pulse signal, the other end of the current control element being connected to one end of an external direction indication switch, and the other end of the direction indication switch being connected to the direction indication lamp;

a current clamp unit which limits the drive current to a current upper limit value by decreasing amplitude of the pulse signal, in a case where the drive current exceeds the current upper limit value;

a voltage clamp unit which limits a reference voltage of one end of the direction indication switch to a voltage upper limit value by decreasing the amplitude of the pulse signal, in a case where the reference voltage exceeds the voltage upper limit value; and a wire disconnection detection unit which outputs a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value, the current upper limit value is smaller than the drive current flowing through the direction indication lamp when the reference voltage is the voltage upper limit value.

In the direction indication lamp control device, the current upper limit value may be greater than the drive current which flows through the direction indication lamp when the reference voltage is the voltage upper limit value in a case where it is assumed that any one of the LED elements is disconnected.

In the direction indication lamp control device, the wire disconnection detection value may be greater than the drive current which flows through the direction indication lamp when the reference voltage is the voltage upper limit value in a case where it is assumed that any one of the LED elements is disconnected.

In the direction indication lamp control device, the pulse signal generation unit may operate using a potential difference between an internal power supply voltage supplied from an external bootstrap circuit, and the reference voltage, as a power source, and the bootstrap circuit may generate the internal power supply voltage based on the reference voltage when the direction indication switch is ON.

In the direction indication lamp control device, the bootstrap circuit may include:

a rectifier, the power supply voltage being applied to one end of the rectifier; and a capacitor, one end of the capacitor being connected to the other end of the rectifier and the other end of the capacitor being connected to one end of the direction indication switch, a voltage of one end of the capacitor may be the internal power supply voltage, and a voltage of the other end of the capacitor may be reference voltage.

In the direction indication lamp control device, the current control element may be configured with an N-type MOS transistor that includes a drain to which the power supply voltage is supplied, a gate to which the pulse signal is supplied, and a source connected to the direction indication switch.

In the direction indication lamp control device, a current detection resistor may be provided between the other end of the current control element and the direction indication switch, and the current clamp unit may include:

a first comparator that compares a voltage between both ends of the current detection resistor and a first voltage corresponding to the current upper limit value, and a first transistor that includes a control terminal to which a comparison result obtained by the first comparator is supplied, one end connected to the control terminal of the current control element, and the other end to which the reference voltage is supplied.

In the direction indication lamp control device, the voltage clamp unit may include:

a second comparator that compares the reference voltage and the voltage upper limit value, and a second transistor that includes a control terminal to which a comparison result obtained by the second comparator is supplied, one end connected to the control terminal of the current control element, and the other end connected to the ground.

In the direction indication lamp control device, the wire disconnection detection unit may include:

a third comparator that compares a voltage between both ends of the current detection resistor and a third voltage corresponding to the wire disconnection detection value, and an AND circuit that outputs a logical product of a comparison result obtained by the third comparator and the pulse signal, as the wire disconnection detection signal.

In the direction indication lamp control device, the wire disconnection detection unit may include:

a fourth comparator in which the comparison result obtained by the second comparator is supplied to a non-inverting input terminal, in which a fourth voltage corresponding to the voltage upper limit value is supplied to an inverting input terminal, and which outputs a comparison result as the wire disconnection detection signal.

In the direction indication lamp control device, the pulse signal generation unit may change a period of the pulse signal after the wire disconnection detection signal is output.

In the direction indication lamp control device, the pulse signal generation unit may shorten the period of the pulse signal after the wire disconnection detection signal is output.

In the direction indication lamp control device, the pulse signal generation unit may fix the pulse signal to a high level so that the drive current continually flows, after the wire disconnection detection signal is output.

A direction indication device according to one aspect of the invention includes:

a pulse signal generation unit that generates a pulse signal having a predetermined period;

a current control element that includes one end to which the power supply voltage is supplied, a control terminal to which the pulse signal is supplied, and the other end which outputs a drive current having a magnitude corresponding to amplitude of the pulse signal;

a direction indication switch, one end of the direction indication switch being connected to the other end of the current control element;

a direction indication lamp configured with LED elements connected in parallel, one end of the direction indication lamp being connected to the other end of the direction indication switch, and the other end of the direction indication lamp being grounded;

a current clamp unit which limits the drive current to a current upper limit value by decreasing amplitude of the pulse signal, in a case where the drive current exceeds the current upper limit value;

a voltage clamp unit which limits a reference voltage of one end of the direction indication switch to a voltage upper limit value by decreasing the amplitude of the pulse signal, in a case where the reference voltage exceeds the voltage upper limit value; and a wire disconnection detection unit which outputs a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value, the current upper limit value is smaller than the drive current flowing through the direction indication lamp when the reference voltage is the voltage upper limit value.

In the direction indication device, the current upper limit value may be greater than the drive current which flows through the direction indication lamp when the reference voltage is the voltage upper limit value in a case where it is assumed that any one of the LED elements is disconnected.

In the direction indication device, the wire disconnection detection value may be greater than the drive current which flows through the direction indication lamp when the reference voltage is the voltage upper limit value in a case where it is assumed that any one of the LED elements is disconnected.

The direction indication device may include:

a bootstrap circuit that generates an internal power supply voltage based on the reference voltage when the direction indication switch is ON, the pulse signal generation unit may operate using a potential difference between the internal power supply voltage and the reference voltage as a power source.

In the direction indication device, the bootstrap circuit may include:

a rectifier, the power supply voltage being applied to one end of the rectifier; and a capacitor, one end of the capacitor being connected to the other end of the rectifier and the other end of the capacitor being connected to one end of the direction indication switch, a voltage of one end of the capacitor may be the internal power supply voltage, and a voltage of the other end of the capacitor may be the reference voltage.

A wire disconnection detection method of a direction indication device according to one aspect of the invention, that includes: a pulse signal generation unit that generates a pulse signal having a predetermined period; a current control element that includes one end to which the power supply voltage is supplied, a control terminal to which the pulse signal is supplied, and the other end which outputs a drive current having a magnitude corresponding to amplitude of the pulse signal; a direction indication switch, one end of the direction indication switch being connected to the other end of the current control element; a direction indication lamp configured with LED elements connected in parallel, one end of the direction indication lamp being connected to the other end of the direction indication switch, and the other end of the direction indication lamp being grounded, includes:

limiting the drive current to a current upper limit value by decreasing amplitude of the pulse signal, in a case where the drive current exceeds the current upper limit value;

limiting a reference voltage of one end of the direction indication switch to a voltage upper limit value by decreasing the amplitude of the pulse signal, in a case where the reference voltage exceeds the voltage upper limit value; and outputting a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value, the current upper limit value is smaller than the drive current flowing through the direction indication lamp when the reference voltage is the voltage upper limit value.

In the wire disconnection detection method of the direction indication device, the current upper limit value may be greater than the drive current which flows through the direction indication lamp when the reference voltage is the voltage upper limit value in a case where it is assumed that any one of the LED elements is disconnected.

In the wire disconnection detection method of the direction indication device, the wire disconnection detection value may be greater than the drive current which flows through the direction indication lamp when the reference voltage is the voltage upper limit value in a case where it is assumed that any one of the LED elements is disconnected.

According to the present invention, a current clamp unit limits drive current to a current upper limit value by decreasing an amplitude of a pulse signal in a case where the drive current supplied to an LED element exceeds the current upper limit value, and a voltage clamp unit limits a reference voltage to a voltage upper limit value by decreasing the amplitude of the pulse signal in a case where the reference voltage applied to the LED element exceeds the voltage upper limit value. Furthermore, the current upper limit value is made to be smaller than the drive current which may flow through the direction indication lamp when the reference voltage is the voltage upper limit value. By the current upper limit value and the voltage upper limit value being set in a relation like this, the control is performed in the normal operation so that the reference voltage does not reach the voltage upper limit value and the drive current is the current upper limit value.

On the other hand, in a case where any one of the LED elements connected in parallel to configure the direction indication lamp is disconnected, the control is performed so that the drive current does not reach the current upper limit value and the reference voltage is the voltage upper limit value, because the drive current which may flow through the direction indication lamp at a certain reference voltage is decreased more than in the normal operation.

Therefore, in a case where the drive current corresponding to the pulse wave of the pulse signal is equal to or less than the wire disconnection detection value which is less than the current upper limit value, or in a case where the reference voltage is equal to the voltage upper limit value, the wire disconnection of the LED element may be detected.

Furthermore, even though any one of the LED elements is disconnected, the drive current flowing through the remaining LED element may be limited, because the reference voltage is limited to the voltage upper limit value. Therefore, the lifetime of the remaining LED element may be extended.

MODES FOR CARRYING OUT THE INVENTION

Embodiments according to the present invention are described below based on the drawings.

[Embodiment 1]

Figure 1:
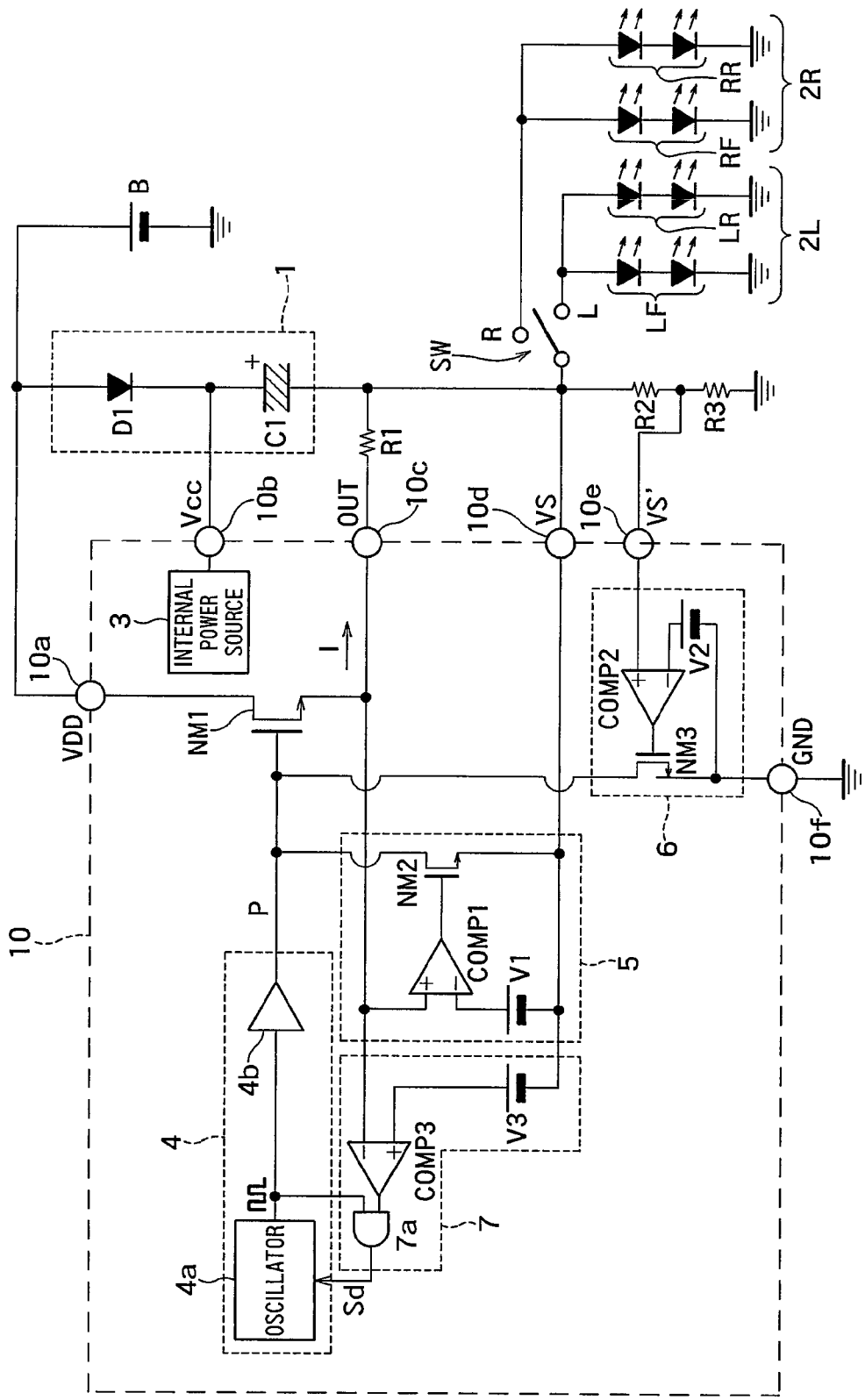
FIG. 1 is a circuit diagram of a direction indication device according to Embodiment 1 of the present invention.

FIG. 1 is a circuit diagram of a direction indication device according to Embodiment 1 of the present invention. As illustrated in FIG. 1, the direction indication device includes a bootstrap circuit 1, a direction indication switch SW, direction indication lamps 2L and 2R, an internal power source 3, a pulse signal generation unit 4, an N-type MOS transistor (a current control element) NM1, a current clamp unit 5, a voltage clamp unit 6, a wire disconnection detection unit 7, a current detection resistor R1, and resistors R2 and R3. The direction indication device is used in, for example, a motor-cycle.

The internal power source 3, the pulse signal generation unit 4, the N-type MOS transistor NM1, the current clamp unit 5, the voltage clamp unit 6 and the wire disconnection detection unit 7 are configured as the direction indication lamp control device (a blinker relay) 10. The direction indication lamp control device 10 may be configured as, for example, a semiconductor integrated circuit.

The bootstrap circuit 1 has a diode (a rectifier) D1 and a capacitor C1. A power supply voltage VDD from a power source B is applied to an anode (one end) of the diode D1. One end of the capacitor C1 is connected to a cathode (the other end) of the diode D1, and the other end thereof is connected to one end of the direction indication switch SW.

The direction indication switch SW may enable a short-circuit to occur between one end and an L terminal (the other end), or between one end and an R terminal (the other end).

A left-side direction indication lamp 2L is configured with a left-front-side LED element LF and a left-rear-side LED element LR which are connected to each other in parallel. A right-side direction indication lamp 2R is configured with a right-front-side LED element RF and a right-rear-side LED element RR which are connected to each other in parallel. In Embodiment 1, each of the LED elements LF, LR, RF, and RR is configured with two LEDs which are connected in series.

An anode side (one end) of the direction indication lamp 2L is connected to an L terminal of the direction indication switch SW, and a cathode side (the other end) thereof is grounded. An anode side (one end) of the direction indication lamp 2R is connected to an R terminal of the direction indication switch SW, and a cathode side (the other end) thereof is grounded.

With this configuration, when the direction indication switch SW is in an ON state to the side of the L terminal or to the side of the R terminal, a current flows from the power source B to the ground GND via the diode D1, the capacitor C1, the direction indication switch SW, and the direction indication lamp 2L or 2R. Accordingly, the capacitor C1 is charged, and the bootstrap circuit 1 generates an internal power supply voltage Vcc, which is a voltage of one end of the capacitor C1, based on a reference voltage VS, which is a voltage of the other end of the capacitor C1. Even though the reference voltage VS changes, "(the internal power supply voltage Vcc)—(the reference voltage VS)" is held almost constant.

The internal power supply voltage Vcc is supplied to an internal power supply voltage terminal 10b of the direction indication lamp control device 10, and the reference voltage VS is supplied to a reference voltage terminal 10d of the direction indication lamp control device 10.

The internal power source 3 is activated using a potential difference between the internal power supply voltage Vcc and the reference voltage VS as a power source, and thus generates a bias voltage based on the reference voltage VS. The generated bias voltage is supplied to each unit in the direction indication lamp control device 10.

The pulse signal generation unit 4 is activated using a potential difference between an internal power supply voltage Vcc and a reference voltage VS as a power source, and generates a pulse signal P with a predetermined period (for example, 0.5 to 1 second). Specifically, the pulse signal generation unit 4 has an oscillator 4a and a buffer 4b. The oscillator 4a generates an oscillation pulse signal with the predetermined period described above, and the buffer 4b generates a pulse signal P by buffering the oscillation pulse signal. The pulse signal P may have an amplitude up to the internal power supply voltage Vcc from the reference voltage VS.

An N-type MOS transistor NM1 has a drain (one end) connected to the power supply voltage terminal 10a of the direction indication lamp control device 10, to which the power supply voltage VDD is supplied, a gate (the control terminal) to which the pulse signal P is supplied, and a source (the other end) which outputs a drive current I. A magnitude of the drive current I corresponds to the amplitude of the pulse signal P. The source of the N-type MOS transistor NM1 is connected to a current output terminal 10c of the direction indication lamp control device 10.

The current detection resistance R1 is provided between the source of the N-type MOS transistor NM1 and one end of the direction indication switch SW. In Embodiment 1, the current detection resistance R1 is connected between the current output terminal 10c and one end of the direction indication switch SW.

With this configuration, the drive current I flows through the LED elements LF and LR of the direction indication lamp 2L or through the LED elements RF and RR of the direction indication lamp 2R, via the direction indication switch SW. Accordingly, the direction indication lamp 2L or 2R blinks at a period of the oscillation pulse signal.

The current clamp unit 5 limits a drive current I to a current upper limit value Imax by decreasing an amplitude of the pulse signal P, in a case where the drive current I exceeds the current upper limit value Imax. Specifically, the current clamp unit 5 has a first comparator COMP1 and an N-type MOS transistor (a first transistor) NM2.

The first comparator COMP1 compares a voltage between both ends of the current detection resistance R1 and a first voltage corresponding to the current upper limit value Imax. That is, in the first comparator COMP1, a non-inverting input terminal is connected to a current output terminal 10c and a first voltage V1 based on a reference voltage VS is supplied to an inverting input terminal.

The N-type MOS transistor NM2 includes a gate (a control terminal) to which a comparison result obtained by the first comparator COMP1 is supplied, a drain (one end) which is connected to the gate of an N-type MOS transistor NM1, and a source (the other end) which is connected to a reference voltage terminal 10d and to which the reference voltage VS is supplied.

The voltage clamp unit 6 limits the reference voltage VS to a voltage upper limit value VSmax by decreasing the amplitude of a pulse signal P, in a case where the reference voltage VS exceeds the voltage upper limit value VSmax. Specifically, the voltage clamp unit 6 has a second comparator COMP2 and an N-type MOS transistor (a second transistor) NM3.

The second comparator COMP2 compares the reference voltage VS and a voltage upper limit value Vmax. In Embodiment 1, in the second comparator COMP2, a non-inverting input terminal is connected to a division reference voltage terminal 10e to which a division reference voltage VS' corresponding to a reference voltage VS is supplied, and a second voltage V2 corresponding to the voltage upper limit value Vmax is supplied to an inverting input terminal. The second voltage V2 is a voltage based on the ground GND. Resistors R2 and R3 are connected in series between the reference voltage terminal 10d and the ground GND, and the division reference voltage terminal 10e is connected to a connection point of resistors R2 and R3.

An N-type MOS transistor NM3 includes a gate (a control terminal) to which a comparison result obtained by a second comparator COMP2 is supplied, a drain (one end) which is connected to the gate of an N-type MOS transistor NM1, and a source (the other end) which is connected to the ground GND via a ground terminal 10f.

The wire disconnection detection unit 7 outputs a wire disconnection detection signal Sd, in a case where the drive current I corresponding to the pulse wave of the pulse signal P is equal to or less than a wire disconnection detection value Id which is less than a current upper limit value Imax. The wire disconnection detection value Id is greater than the drive current I which flows through a direction indication lamp 2L (or 2R) when the reference voltage VS is the voltage upper limit value VSmax, in a case where it is assumed that any one of the LED elements LF and LR of a direction indication lamp 2L (or, any one of LED elements RF and RR of a direction indication lamp 2R) is disconnected.

Specifically, the wire disconnection detection unit 7 has a third comparator COMP3 and an AND circuit 7a. The third comparator COMP3 compares the voltage between both ends of the current detection resistance R1 and a third voltage V3 corresponding to the wire disconnection detection value Id. That is, in the third comparator COMP3, an inverting input terminal is connected to a current output terminal 10c and a third voltage V3 based on a reference voltage VS is supplied to a non-inverting input terminal.

The AND circuit 7a outputs a logical product of a comparison result obtained by the third comparator COMP3 and an oscillation pulse signal (a pulse signal P) as a wire disconnection detection signal Sd.

The wire disconnection detection signal Sd is supplied to an oscillator 4a. The oscillator 4a changes a period of the oscillation pulse signal, after a high level of the wire disconnection detection signal Sd is output. That is, a pulse signal generation unit 4 changes a period of the pulse signal P, after the high level of the wire disconnection detection signal Sd is output. The period of the pulse signal P may be shortened (for example, 0.25 to 1/(2.4) second) and may be lengthened. Otherwise, the pulse signal generation unit 4 may fix the pulse signal P to a high level, so that the drive current I continuously flows, after the high level of the wire disconnection detection signal Sd is output.

Next, a relation between the current upper limit value Imax and the voltage upper limit value VSmax is described.

Figure 2:
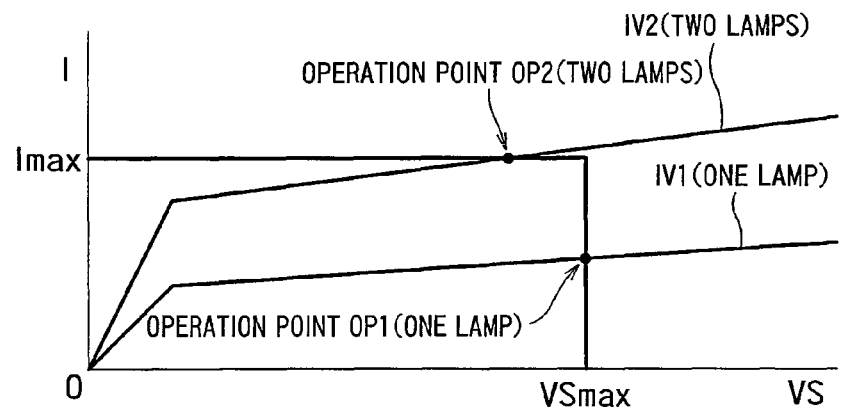
FIG. 2 is a view to describe an operation point of the direction indication device according to Embodiment 1 of the present invention.

FIG. 2 is a view to describe an operation point of the direction indication device according to Embodiment 1 of the present invention. At this point, a direction indication lamp 2L will be described. FIG. 2 illustrates characteristic lines showing relations between the drive current I flowing through the direction indication lamp 21, and the reference voltage VS applied to the direction indication lamp 2L, in a case (the characteristic line IV2 (two lamps)) where two LED elements LF and LR of the direction indication lamp 2L are lit, and in a case (the characteristic line IV1 (one lamp)) where any one of the LED elements of the direction indication lamp 2L is disconnected and thus one LED element is lit.

As illustrated in FIG. 2, the current upper limit value Imax is smaller than the drive current I which may flow through the direction indication lamp 2L when the reference voltage VS is the voltage upper limit value VSmax on the characteristic line IV2. Furthermore, the current upper limit value Imax is greater than the drive current I which flows through the direction indication lamp 2L when the reference voltage VS is the voltage upper limit value VSmax on the characteristic line IV1, in a case where it is assumed that any one of the LED elements of the direction indication lamp 2L is disconnected.

By setting the current upper limit value Imax and the voltage upper limit value VSmax as described above, in a case where two LED elements are lit, the direction indication device operates at an operation point OP2 on the characteristic line IV2, where the drive current I is the current upper limit value Imax and the reference voltage VS is a value smaller than the voltage upper limit value VSmax. Furthermore, in a case where one LED element is lit, the direction indication device operates at an operation point OP1 on the characteristic line IV1, where the reference voltage VS is the voltage upper limit value VSmax and the drive current I is a value smaller than the current upper limit value Imax.

Figure 3:
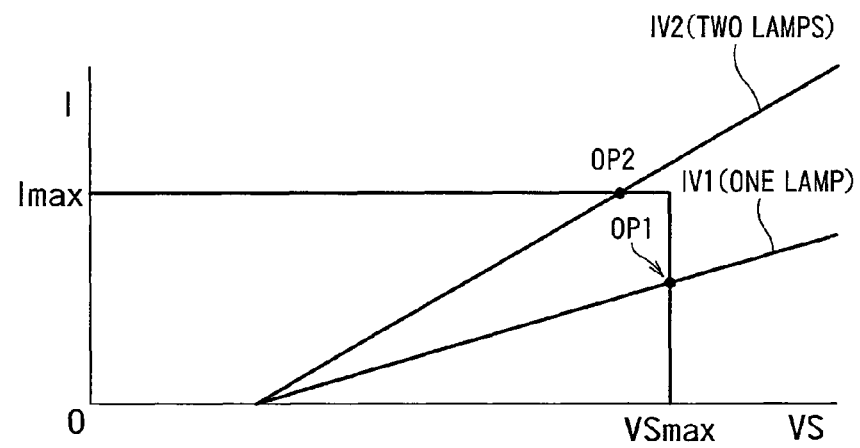
FIG. 3 is another view to describe an operation point of the direction indication device according to Embodiment 1 of the present invention.

Furthermore, FIG. 3 illustrates similar characteristic line as FIG. 2, with respect to a LED element through which the current flows when the reference voltage VS is equal to or more than a forward voltage. Even in a case where the characteristics of the LED element are different from those in the example of FIG. 2, as illustrated in FIG. 3, the current upper limit value Imax and the voltage upper limit value VSmax may be set in the same manner as is described above.

Next, operation of the direction indication device, for example, in a case where the direction indication lamp 2L blinks, will be described.

Figure 4:
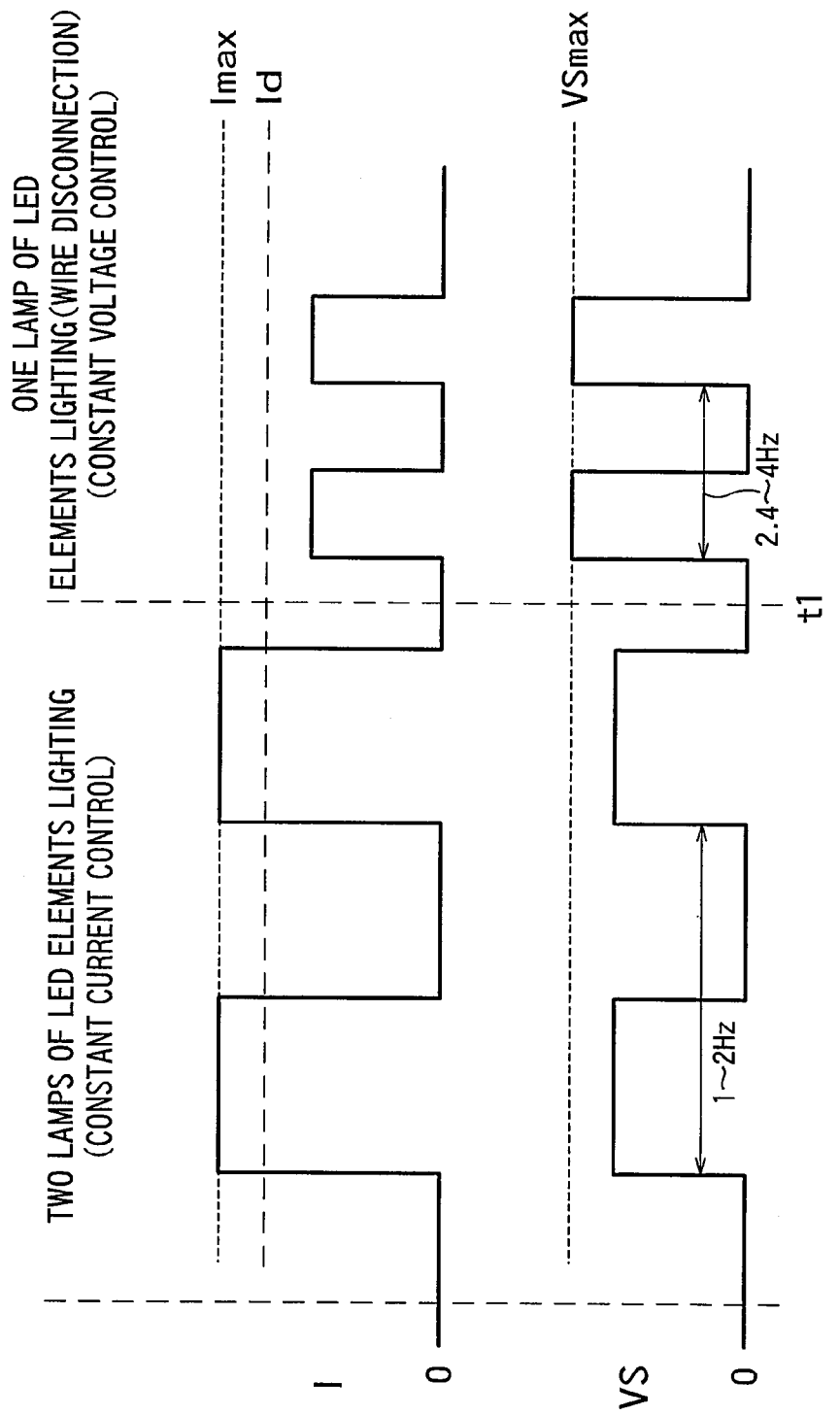
FIG. 4 is a waveform chart of the direction indication device according to Embodiment 1 of the present invention.

FIG. 4 is a waveform chart of the direction indication device according to Embodiment 1 of the present invention. FIG. 4 illustrates changes over time in the drive current I flowing through the direction indication lamp 2L and the reference voltage VS applied to the direction indication lamp 2L when the direction indication switch SW is ON to the side of the L terminal. In the example illustrated, at the point in time t1, any one of the LED elements of the direction indication lamp 2L is disconnected.

Until the point in time t1, as described above, the direction indication device operates at the operation point OP2 in FIG. 2. That is, the current clamp unit 5 limits the drive current I to the current upper limit value Imax, by decreasing the amplitude of the pulse signal P, in a case where the drive current I exceeds the current upper limit value Imax. Namely, the drive current I is controlled in such a manner as to maintain a constant current. At this time, the N-type MOS transistor NM3 of the voltage clamp unit 6 is OFF, and thus does not influence the control of the amplitude of the pulse signal P.

As illustrated in FIG. 2, the drive current I and the reference voltage VS change like a pulse at a period of the pulse signal P, and the direction indication lamp 2L also blinks at such a period. As is described above, for example, the period is an arbitrary value of 0.5 to 1 second, that is, a blinking frequency is an arbitrary value of 1 to 2 Hz.

After the point in time t1 at which a wire disconnection occurs, as described above, the operation point OP2 of FIG. 2 moves to the operation point OP1. That is, the voltage clamp unit 6 limits the reference voltage VS to the voltage upper limit value VSmax by decreasing the amplitude of the pulse signal P, in a case where the reference voltage VS exceeds the voltage upper limit value VSmax. Namely, the reference voltage VS is controlled in such a manner as to maintain a constant voltage. At this time, the N-type MOS transistor NM2 of the current clamp unit 5 is OFF, and thus does not influence the control of the amplitude of the pulse signal P.

During a period for which the drive current I when the direction indication lamp 2L is lighted, namely, the drive current I corresponding to the pulse wave of the pulse signal P, is equal to or less than the wire disconnection detection value Id, the wire disconnection detection unit 7 outputs a high level of the wire disconnection detection signal Sd.

Accordingly, the period of the pulse signal P is changed. As described above, for example, the changed period is an arbitrary value of 0.25 to 1/(2.4) second, that is, the frequency is an arbitrary value of 2.4 to 4 Hz. Thus, the drive current I and the reference voltage VS also change like a pulse at the changed period of the pulse signal P and the direction indication lamp 2L also blinks at such a period. By a blinking period of the direction indication lamp 2L being made to be different than at a normal operation, the wire disconnection of the LED element may be reported to a user or the like.

As described above, according to Embodiment 1, in a case where the drive current I supplied to the LED elements LF and LR or RF and RR exceeds the current upper limit value Imax, the current clamp unit 5 limits the drive current I to the current upper limit value Imax by decreasing the amplitude of the pulse signal P. In addition, in a case where the reference voltage VS applied to the LED elements LF and LR or RF and RR exceeds the voltage upper limit value VSmax, the voltage clamp unit 6 limits the reference voltage VS to the voltage upper limit value VSmax by decreasing the amplitude of the pulse signal P. Furthermore, the current upper limit value Imax is smaller than the drive current I which may flow through the direction indication lamp 2L or 2R when the reference voltage VS is the voltage upper limit value VSmax.

By the current upper limit value Imax and the voltage upper limit value VSmax being set to the relation like this, the reference voltage VS does not reach the voltage upper limit value VSmax at a time of normal operation, and the drive current I is controlled so as to be the current upper limit value Imax. Namely, since the constant current flows through the LED element LF and LR or RF and RR, this causes the LED elements to have an increased lifetime, and may stabilize the amount of light.

On the other hand, in a case where any one of the LED elements LF and LR connected in parallel (or, any one of the LED elements RF and RR connected in parallel) is disconnected, the reference voltage VS is controlled so that the drive current I does not reach the current upper limit value Imax and the reference voltage VS is the voltage upper limit value VSmax, because the drive current I which may flow through the direction indication lamp 2L (or, 2R) at a certain reference voltage VS is decreased more than at a time of normal operation.

Consequently, in a case where the drive current I corresponding to the pulse wave of the pulse signal P is equal to or less than the wire disconnection detection value Id which is smaller than the current upper limit value Imax, the wire disconnection of the LED element may be detected.

Additionally, even in a case where any one of the LED element is disconnected, the drive current I flowing through the remaining LED element may be limited because the reference voltage VS is limited to the voltage upper limit value VSmax. Therefore, the lifetime of the remaining LED element may be extended.

[Embodiment 2]

Embodiment 2 is different from Embodiment 1, in a configuration of the wire disconnection detection unit.

Figure 5:
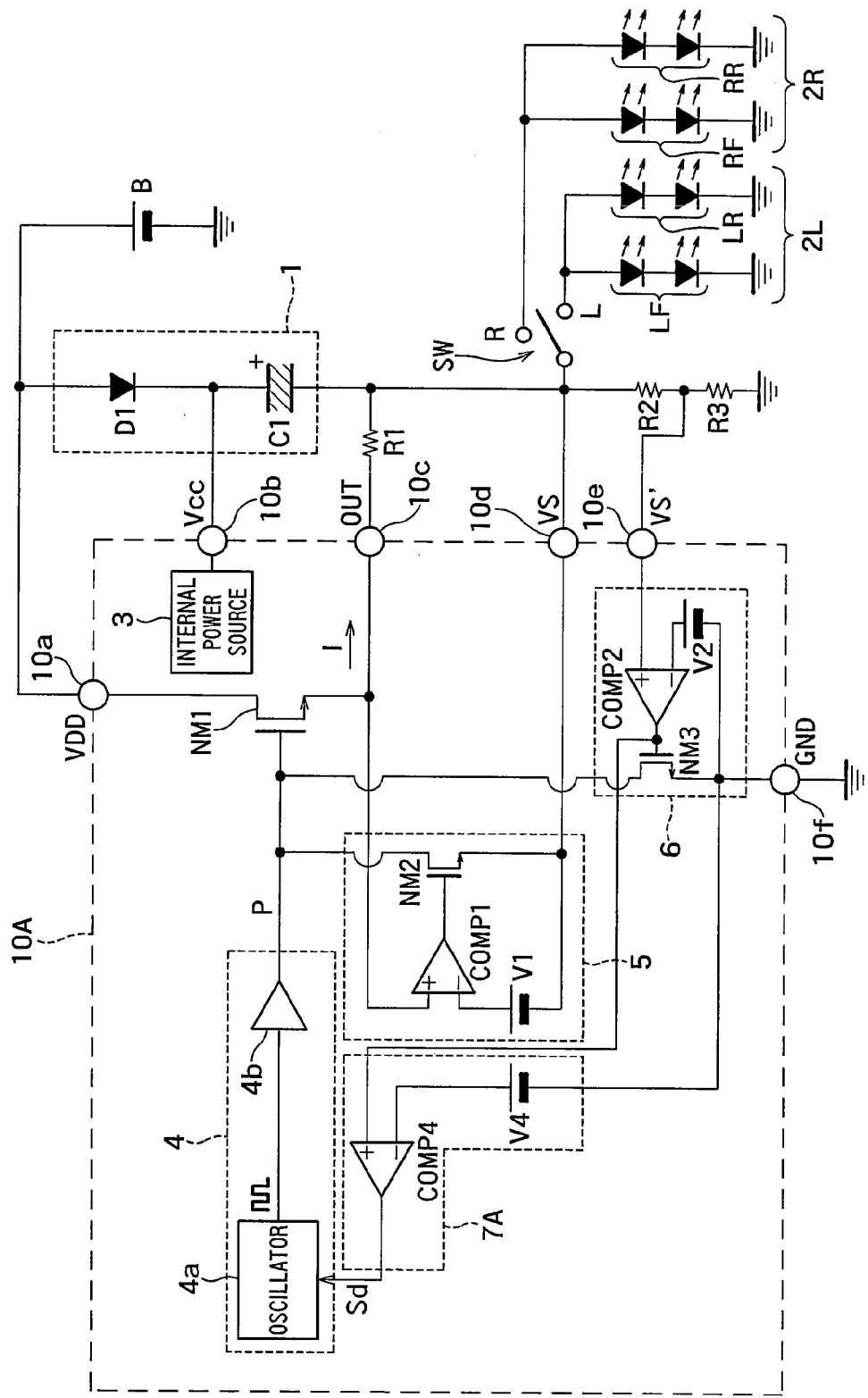
FIG. 5 is a circuit diagram of a direction indication device according to Embodiment 2 of the present invention.
Figure 6:
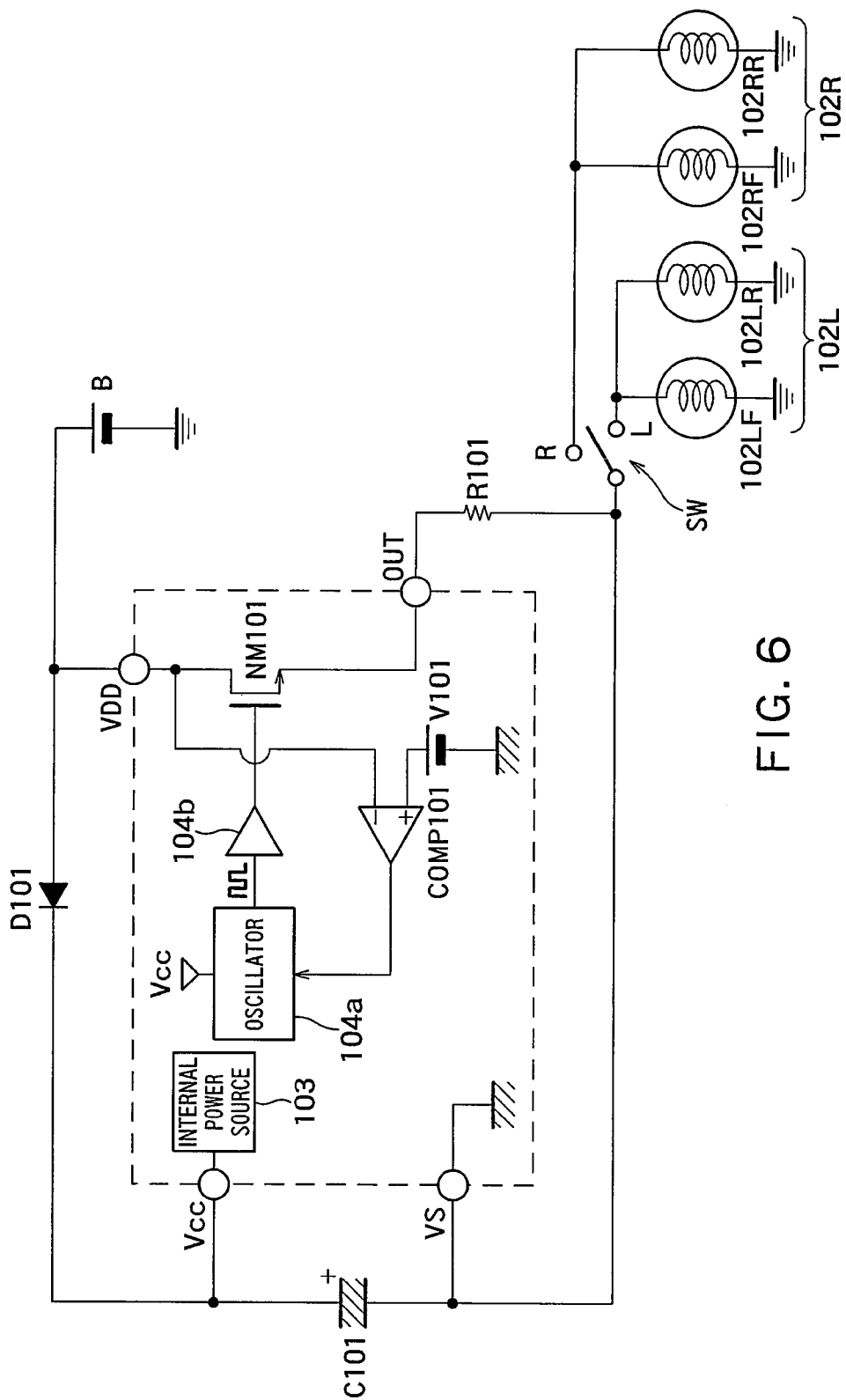
FIG. 6 is a circuit diagram of a conventional direction indication device.

FIG. 5 is a circuit diagram of a direction indication device according to Embodiment 2 of the present invention. As illustrated in FIG. 5, the direction indication lamp control device 10A includes a wire disconnection detection unit 7A instead of the wire disconnection detection unit 7 of Embodiment 1. Because other circuit configurations are the same as are described in Embodiment 1 of FIG. 1, the same components are given the same reference signs and the descriptions of the same components are not repeated.

The wire disconnection detection unit 7A outputs a wire disconnection detection signal Sd, in a case where a reference voltage VS is equal to a voltage upper limit value VSmax. Specifically, the wire disconnection detection unit 7A has a fourth comparator COMP4. In the fourth comparator COMP4, the comparison result obtained by the second comparator COMP2 is supplied to a non-inverting input terminal and a fourth voltage V4 corresponding to a voltage upper limit value VSmax is supplied to an inverting input terminal. The fourth comparator COMP4 outputs a comparison result as a wire disconnection detection signal Sd. The fourth voltage V4 is a voltage based on the ground GND.

An operation waveform of the direction indication device is the same as illustrated in FIG. 4. Namely, after a point in time t1 at which a wire disconnection occurs, a reference voltage VS applied when a direction indication lamp 2L or 2R is lighted is controlled in such a manner as to be a voltage upper limit value VSmax. During a period for which the reference voltage VS is controlled to the voltage upper limit value VSmax, the comparison result obtained by the second comparator COMP2 is higher than a low level. Accordingly, the fourth comparator COMP4 detects this state and a high level of the wire disconnection detection signal Sd is output. Therefore, by the blinking period of the direction indication lamp 2L or 2R being changed, the wire disconnection of the LED element may be reported to a user or the like.

Namely, in Embodiment 2, the same effect as in Embodiment 1 may also be obtained.

Although the embodiments of the present invention have been described in detail, the specific constitution is not limited to these embodiments and can be modified variously without departing the gist of the present invention.

For example, the direction indication lamp control devices 10 and 10A may be configured using a bipolar transistor instead of the MOS transistor.

Furthermore, the number of the LED elements configuring each of the direction indication lamps 2L and 2R may be equal to or more than 3. The number of the LEDs configuring each of the LED elements LF, LR, RF, and RR may be 1 or may be equal to or more than 3.

Furthermore, an example in which the diode D1 is used in the bootstrap circuit 1 is described, but the configuration is not limited to this. Instead of the diode D1, a transistor may be used, which is controlled so as to permit the current to flow through a capacitor C1 when a power supply voltage VDD is greater than an internal power supply voltage Vcc, and so as to interrupt the current from the capacitor C1 when the power supply voltage VDD is smaller than the internal power supply voltage Vcc, and which functions as a rectifier.

DESCRIPTION OF REFERENCE NUMERALS

1 Bootstrap circuit
SW Direction indication switch
2L, 2R Direction indication lamp
LF, LR, RF, RR LED element
3 Internal power source
4 Pulse signal generation unit
4a Oscillator
4b Buffer
5 Current clamp unit
6 Voltage clamp unit
7, 7A Wire disconnection detection unit
10, 10A Direction indication lamp control device
R1 Current detection resistance R2, R3 Resistor
D1 Diode (rectifier)
C1 Capacitor
NM1 N-type MOS transistor (current control element)
NM2 N-type MOS transistor (first transistor)
NM3 N-type MOS transistor (second transistor)
COMP1 First comparator
COMP2 Second comparator
COMP3 Third comparator
COMP4 Fourth comparator

The invention claimed is:

1. A direction indication lamp control device for controlling a direction indication lamp configured with LED elements connected in parallel, comprising:
   a pulse signal generation unit that generates a pulse signal having a predetermined period;
   a current control element comprising one end to which power supply voltage is supplied, a control terminal to which the pulse signal is supplied, and the other end which outputs a drive current having a magnitude corresponding to amplitude of the pulse signal, the other end of the current control element being connected to one end of an external direction indication switch, and the other end of the direction indication switch being connected to the direction indication lamp;
   a current clamp unit which limits the drive current to a current upper limit value by decreasing amplitude of the pulse signal, in a case where the drive current exceeds the current upper limit value;
   a voltage clamp unit which limits a reference voltage of one end of the direction indication switch to a voltage upper limit value by decreasing the amplitude of the pulse signal, in a case where the reference voltage exceeds the voltage upper limit value; and
   a wire disconnection detection unit which outputs a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value,
   wherein the current upper limit value is smaller than the drive current flowing through the direction indication lamp when the reference voltage is the voltage upper limit value.

2. The direction indication lamp control device according to claim 1,
   wherein the current upper limit value is greater than the drive current which flows through the direction indication lamp when the reference voltage is the voltage upper limit value in a case where it is assumed that any one of the LED elements is disconnected.

3. The direction indication control device according to claim 1,
   wherein the wire disconnection detection value is greater than the drive current which flows through the direction indication lamp when the reference voltage is the voltage upper limit value in a case where it is assumed that any one of the LED elements is disconnected.

4. The direction indication lamp control device according to claim 1,
   wherein the pulse signal generation unit operates using a potential difference between an internal power supply voltage supplied from an external bootstrap circuit, and the reference voltage, as a power source, and
   wherein the bootstrap circuit generates the internal power supply voltage based on the reference voltage when the direction indication switch is ON.

5. The direction indication lamp control device according to claim 4,
   wherein the bootstrap circuit comprises:
   a rectifier, the power supply voltage being applied to one end of the rectifier; and
   a capacitor, one end of the capacitor being connected to the other end of the rectifier and the other end of the capacitor being connected to one end of the direction indication switch,
   wherein a voltage of one end of the capacitor is the internal power supply voltage, and a voltage of the other end of the capacitor is the reference voltage.

6. The direction indication lamp control device according to claim 4,
   wherein the current control element is configured with an N-type MOS transistor that comprises a drain to which the power supply voltage is supplied, a gate to which the pulse signal is supplied, and a source connected to the direction indication switch.

7. The direction indication lamp control device according to claim 6,
   wherein a current detection resistor is provided between the other end of the current control element and the direction indication switch, and
   wherein the current clamp unit comprises:
   a first comparator that compares a voltage between both ends of the current detection resistor and a first voltage corresponding to the current upper limit value, and
   a first transistor that comprises a control terminal to which a comparison result obtained by the first comparator is supplied, one end connected to the control terminal of the current control element, and the other end to which the reference voltage is supplied.

8. The direction indication lamp control device according to claim 6,
   wherein the voltage clamp unit comprises:
   a second comparator that compares the reference voltage and the voltage upper limit value, and
   a second transistor that comprises a control terminal to which a comparison result obtained by the second comparator is supplied, one end connected to the control terminal of the current control element, and the other end connected to the ground.

9. The direction indication lamp control device according to claim 7,
   wherein the wire disconnection detection unit comprises:
   a third comparator that compares a voltage between both ends of the current detection resistor and a third voltage corresponding to the wire disconnection detection value, and
   an AND circuit that outputs a logical product of a comparison result obtained by the third comparator and the pulse signal, as the wire disconnection detection signal.

10. The direction indication lamp control device according to claim 8,
    wherein the wire disconnection detection unit comprises:
    a fourth comparator in which the comparison result obtained by the second comparator is supplied to a non-inverting input terminal, in which a fourth voltage corresponding to the voltage upper limit value is supplied to an inverting input terminal, and which outputs a comparison result as the wire disconnection detection signal.

11. The direction indication lamp control device according to claim 1, wherein the pulse signal generation unit changes a period of the pulse signal after the wire disconnection detection signal is output.

12. The direction indication lamp control device according to claim 11,
wherein the pulse signal generation unit shortens the period of the pulse signal after the wire disconnection detection signal is output.

13. The direction indication lamp control device according to claim 1,
wherein the pulse signal generation unit fixes the pulse signal to a high level so that the drive current continually flows, after the wire disconnection detection signal is output.

14. A wire disconnection detection method of a direction indication device that comprises: a pulse signal generation unit that generates a pulse signal having a predetermined period; a current control element that comprises one end to which the power supply voltage is supplied, a control terminal to which the pulse signal is supplied, and the other end which outputs a drive current having a magnitude corresponding to amplitude of the pulse signal; a direction indication switch, one end of the direction indication switch being connected to the other end of the current control element; a direction indication lamp configured with LED elements connected in parallel, one end of the direction indication lamp being connected to the other end of the direction indication switch, and the other end of the direction indication lamp being grounded, the wire disconnection detection method comprising:
  limiting the drive current to a current upper limit value by decreasing amplitude of the pulse signal, in a case where the drive current exceeds the current upper limit value;
  limiting a reference voltage of one end of the direction indication switch to a voltage upper limit value by decreasing the amplitude of the pulse signal, in a case where the reference voltage exceeds the voltage upper limit value; and
  outputting a wire disconnection detection signal in a case where the drive current corresponding to the pulse wave of the pulse signal is equal to or less than a wire disconnection detection value which is less than the current upper limit value, or in a case where the reference voltage is equal to the voltage upper limit value,
  wherein the current upper limit value is smaller than the drive current flowing through the direction indication lamp when the reference voltage is the voltage upper limit value.

* * * * *